July 5, 1955  E. I. GROFF  2,712,291
DOUGH EXTRUDING AND CUT-OFF MECHANISM
FOR PRETZEL TWISTING MACHINE
Original Filed Sept. 21, 1951   2 Sheets-Sheet 1

INVENTOR.
EDWIN I. GROFF
BY *Potts and Brune*
ATTORNEYS

July 5, 1955

E. I. GROFF 2,712,291

DOUGH EXTRUDING AND CUT-OFF MECHANISM
FOR PRETZEL TWISTING MACHINE

Original Filed Sept. 21, 1951

INVENTOR.
EDWIN I. GROFF
BY
ATTORNEYS

United States Patent Office 2,712,291
Patented July 5, 1955

2,712,291

DOUGH EXTRUDING AND CUT-OFF MECHANISM FOR PRETZEL TWISTING MACHINE

Edwin I. Groff, West Reading, Pa., assignor to Quinlan Pretzel Company, Inc., Reading, Pa., a corporation of Pennsylvania Original application September 21, 1951, Serial No. 247,631. Divided and this application August 30, 1952, Serial No. 307,286

2 Claims. (Cl. 107—14)

The present invention relates to mechanism that is included in pretzel twisting machines for the purpose of extruding dough through an orifice and cutting off pieces of the dough as it is so extruded. This application is a division of the co-pending application of Edwin I. Groff, Serial Number 247,631, filed September 21, 1951, and entitled "Pretzel Twisting Machine."

It has been the practice to include, in a pretzel twisting machine, a supply hopper which receives the dough that is ultimately processed into the pretzels. The dough is fed from this hopper by a pair of complemental feed rollers into a pair of extruding worms which force the dough under pressure through an orifice. At the orifice a knife repeatedly cuts off pieces of dough from the mass.

In the past, considerable difficulty has been experienced with this phase of the operation. The extruding worms are positively driven and there is a considerable pressure on the dough at the orifice. As the knife heretofore used moves across the orifice it is subjected to this pressure which creates the liability of breakage. Moreover, in spite of all of the efforts which have been directed at keeping foreign objects out of the dough, such objects do get into the dough. These objects may take the form of a key, bolt, nail, or other pieces of metal, and when engaged by the knife damage results.

An important object of the present invention is the provision of a new and improved knife which will obviate these conditions. This object is achieved by providing a reciprocating knife which is yieldably mounted on a horizontal axis and spring biased against the path of movement of the dough mass. Such a knife will move with the dough and will yield if it strikes hard objects. Moreover, on the return, or upstroke, the knife passes through the same opening which is formed by the cutting off of a piece of dough without exhibiting any tendency to wipe the dough back through the orifice.

Various other more detailed objects and advantages of the invention, such as arise in connection with carrying out the above noted ideas in a practical embodiment, will in part become apparent, and in part be hereinafter stated as the description of the invention proceeds.

The invention therefore comprises dough extruding and cut-off mechanism which is intended to be included as a part of a pretzel twisting machine and which consists essentially of a supply hopper, feed rollers for taking dough from the hopper and feeding it to a pair of extruding worms, a plate having an orifice at the delivery end of the worms, and a spring-biased knife pivotally mounted on a horizontal axis and which reciprocates across said orifice to cut off pieces of dough from the mass that is extruded therethrough.

For a full and more complete understanding of the invention, reference may be had to the following description and accompanying drawings wherein.

Figure 1:
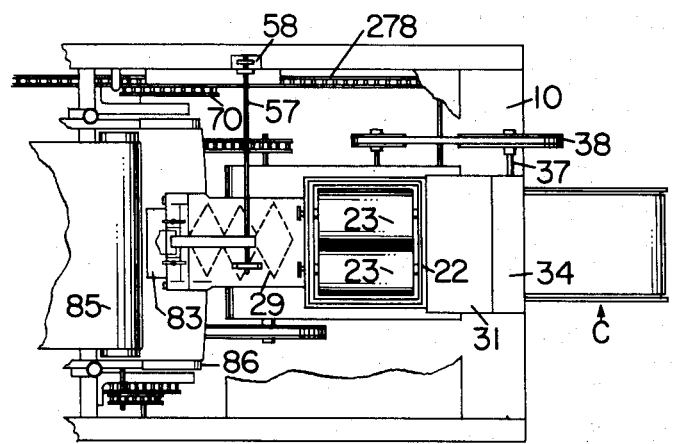
Figure 1 is a top plan view of that portion of a pretzel twisting machine that includes the dough extruding and cut-off mechanism of this invention.

Upon referring to Figures 1 and 2, it will be seen that the hopper 22 is of rectangular formation and mounted below the lower end thereof are a pair of complemental feed rolls 23. These feed rolls 23 are drivably carried by shafts 24 which are in parallel relation and which are journalled in wall structure 25 that upstands from a worm casing 26. At the inner end of this casing 26 there is an end closure plate 27 formed with an orifice 28. A pair of complemental worms 29 are carried by shafts 30 which are journalled in the worm casing 26 with the worms 29 being located below the feed rolls 23.

The shafts 24 project beyond the wall structure 25 at the front end and into a gear casing 31. The shafts 30 also project through the worm casing 26 and through the gear casing 31. The shafts 24 carry gears 32 which mesh and cause the feed rolls to be driven together. Likewise, the worm shafts 30 carry gears 33 which mesh and cause the worms to be driven together. Moreover, one of the gears 32 meshes with one of the gears 33 so that the feed roll shafts 24 are driven from one of the worm shafts 30.

One of the worm shafts 30 is projected beyond the gear casing 31 and into a worm gear casing 34 where it drivably carries a worm gear 35. Meshing with the worm gear 35 is a worm 36 that is drivably carried by a shaft 37.

Figure 2:
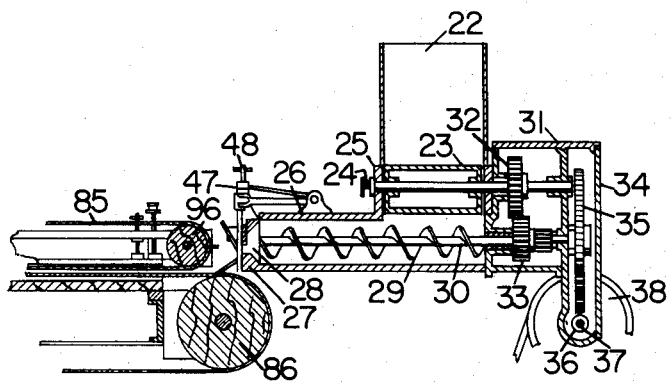
Figure 2 is a view taken as a longitudinal vertical section through the mechanism illustrated in Figure 1.

As shown in Figure 1, the shaft 37 extends out beyond the worm gear casing 34 at the right-hand side and drivably carries a pulley 38. A drive belt passes over this pulley and also over a pulley which is included as a part of a gear box equipped with an adjusting chain 278. Thus, the feed rolls 23 and worms 29 are driven from the gear box and serve to take the dough from the hopper 22 and force it out of the orifice 28 under pressure.

Figure 3:
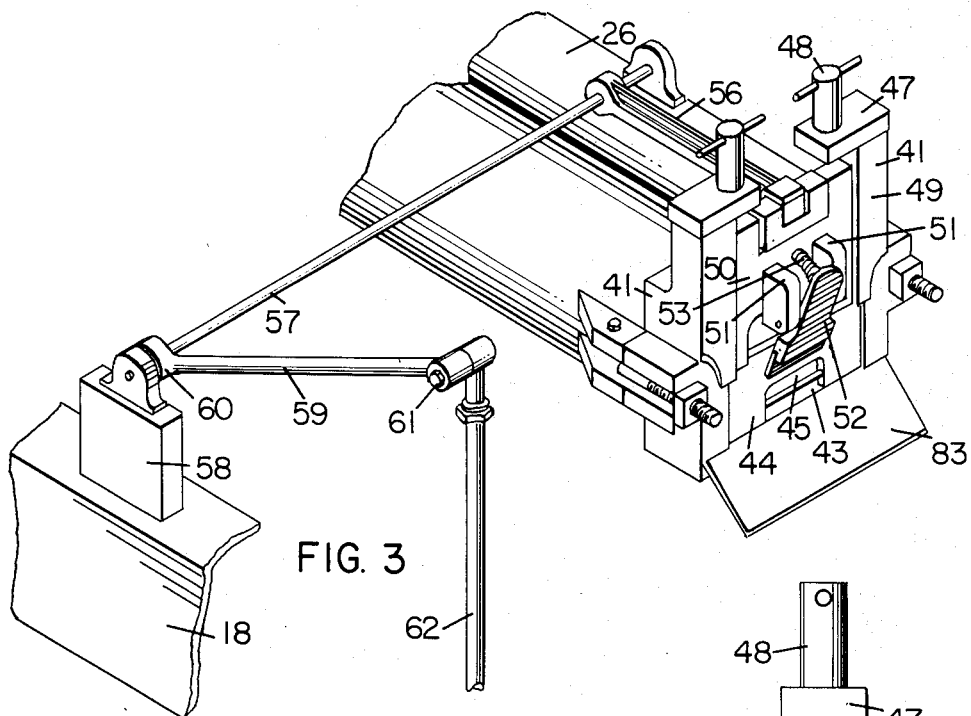
Figure 3 is a detailed perspective, taken on an enlarged scale, illustrating the knife and associated instrumentalities.
Figure 4:
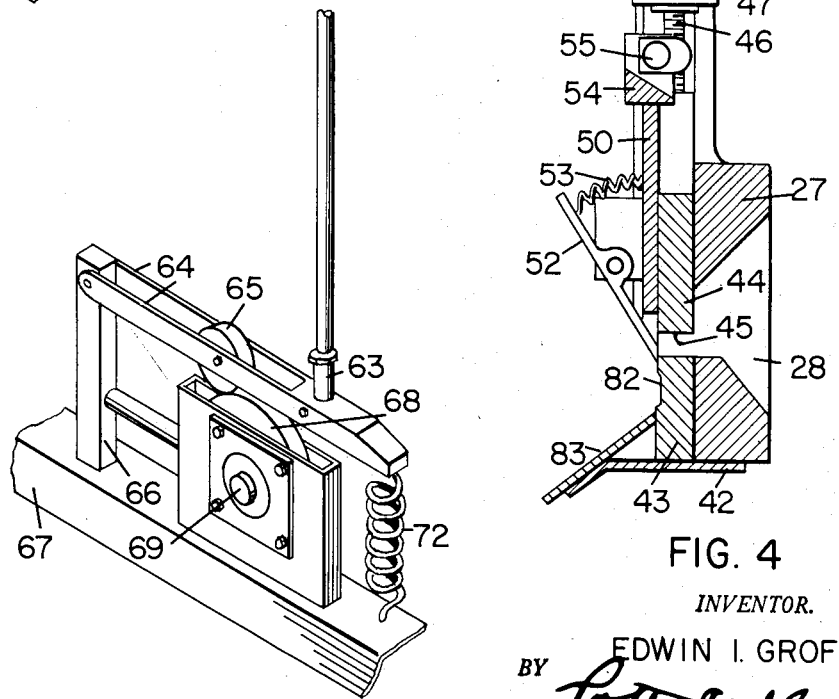
Figure 4 is another detailed view taken on an enlarged scale, and is a section through the knife and parts immediately associated therewith, the driving arm being omitted in this view.

Referring now more particularly to Figures 3 and 4, the knife assembly which is mounted on the inner end of the worm gear casing will be described. Secured to opposite sides of the worm gear casing 26, by bolts, are a pair of side pieces 41. Extending between these side pieces at the bottom is a plate 42 which carries a center block 43, the upper edge of which is in alignment with the bottom edge of the orifice 28.

A U-shaped plate 44 has legs which extend on opposite sides of the center block 43 and has an edge at 45 that is spaced above the edge of the center block 43. The plate 44 may be adjusted relative to the center block 43 to vary the distance between the edge 45 and the center block and thus vary the area of the orifice through which the dough is extruded. This adjustment is obtained by screw stems 46 which are secured to the U-shaped plate 44 and which extend upwardly through top brackets 47 carried by the side pieces 41. Sleeves 48 are fitted over the upper ends of the stems 46 and are provided with operating handles to facilitate their rotation. It is evident that by rotating the sleeves 48, the U-shaped plate 44 may be raised or lowered to vary the effective area of the orifice defined by this plate 44 and the center block 43.

Also carried by the side pieces 41 are guide strips 49 which define channels which receive the edges of a reciprocating plate 50. The plate 50 carries a pair of ears 51 and between which ears is pivotally mounted a knife 52. The lower portion of this knife at which the knife edge is formed is sufficiently wide in extent to span the distance between the legs of the U-shaped plate 44. The upper portion of the knife is located between the ears 51 and an expansion coil spring 53 normally biases the upper portion outwardly. Due to the pivotal mounting, this forces the knife edge inwardly against the plate 44 with a yielding pressure.

The upper edge of the reciprocating plate 50 is formed with a recess which receives a connecting block 54. The connecting block 54 is also formed with a central recess across which extends a pin 55.

An arm 56 is formed at one end with a slot which receives this pin 55. The arm 56 is drivably carried by shaft 57 which has one end journalled on the worm casing 26 and the other end on a support 58 that upstands from the top piece 18 of the side frame. It is evident that as the shaft 57 is oscillated the arm 56 is moved upwardly and downwardly to reciprocate the plate 50 which carries the knife 52.

Another arm 59 has one end drivably secured to the shaft 57, as indicated at 60, and its free end is pivotally connected, as indicated at 61, to a link 62. Secured to the lower end of the link 62, as at 63, is a lever defined by spaced side straps 64. Pivotally mounted between the straps 64 and intermediate the ends thereof is a cam follower 65. At the end remote from the connection 63 the straps 64 are pivotally mounted on a supporting bracket 66. The latter upstands from a horizontal support 67 which extends between the vertical uprights of the side frame.

A cam 68 is carried by stub shaft 69 which also carries a sprocket 70. This sprocket is driven by a chain. A tension coil spring 72 has one end anchored to the free end of the lever 64 and its other end to the horizontal frame 67. This spring maintains the cam follower 65 against the cam 68. It is evident that as the shaft 69 is rotated the cam 68 is also rotated to raise or lower the cam follower 65, depending upon the configuration of the cam and thus reciprocate the link 62 with the motion being ultimately transmitted to the knife 52.

Referring now again more particularly to Figures 3 and 4, it will be noted that the center block 43 is formed with a longitudinally extending depression 82 on its exposed face immediately beneath its upper edge. This depression aids in assuring that each piece of dough is cleanly cut from the mass which is extruded through the orifice. The cut piece of dough falls onto an inclined apron 83 from which it passes down to the roller apron assembly comprising a lower apron passing over an idler roller 86 and an upper apron 85 driven by roller 96, the dough strips being subsequently twisted into pretzel form and delivered to an upwardly inclined conveyor C.

Briefly referring to the novel features of the operation of the knife above described, it is noted that the dough in the worm casing is under constant pressure. This means that it exhibits a tendency to constantly move through the orifice defined by the center block 43 and U-shaped plate 44. However, such movement is readily accommodated by the yielding bias of the knife. The spring 53 will give and permit the knife to yield a slight amount as it makes each cut and on the return stroke the knife passes through the same opening formed by cutting off a piece of dough without wiping the dough back through the space 45.

Furthermore, should any hard, foreign objects be present in the dough, the knife, upon striking thereagainst, will yield rather than be damaged.

While a preferred specific embodiment of the invention is hereinbefore set forth, it is to be clearly understood that the invention is not to be limited to the exact construction, mechanisms, and devices illustrated and described because various modifications of these details may be provided, in putting the invention into practice within the purview of the appended claims.

What is claimed is:

1. In a pretzel twisting machine including a worm casing having an end wall formed with an orifice and a worm within said casing for extruding dough through said orifice under pressure, the improvement consisting of a spring-biased yielding knife assembly mounted on said casing and positioned at said end wall over said orifice, said knife assembly comprising a pair of relatively movable complemental plate members engaging the outer surface of said end wall and defining an opening in alignment with said orifice, means for adjusting the relative position of said plate members to vary the effective area of said opening, a plate mounted for reciprocation on the exposed face of one of said plate members, the other of said plate members being provided with a longitudinal depression in its exposed face beneath said opening, a knife pivotally mounted on said reciprocating plate on an axis normal to its direction of reciprocation and having a cutting edge normally engaging said plate members and adapted to extend across said opening, spring means biasing said knife edge into engagement with said plate members, and driving connections for reciprocating the plate on which said knife is mounted.

2. In a pretzel twisting machine including a worm casing having an end wall formed with an orifice and a worm within said casing for extruding dough through said orifice under pressure, the improvement consisting of a spring-biased yielding knife assembly comprising a center block on said end wall having a top edge disposed substantially at said orifice and provided with a longitudinal depression in its exposed face beneath said top edge, a U-shaped plate having legs straddling said center block and cooperating therewith to provide an opening in alignment with said orifice, means for adjusting the position of said plate with respect to said center block to vary the effective area of said opening, a plate mounted for reciprocation on the exposed face of said U-shaped plate, a pair of ears outstanding from said reciprocating plate, a knife pivotally mounted between said ears and having a cutting edge adapted to span said opening, spring means associated with said knife and reciprocating plate for urging said cutting edge into engagement with said U-shaped plate, and driving means for reciprocating said knife.

References Cited in the file of this patent

UNITED STATES PATENTS

| | | |
|---|---|---|
| 598,404 | Weichert | Feb. 1, 1898 |
| 1,350,722 | Goodenberger | Aug. 24, 1920 |
| 1,352,826 | Michalek | Sept. 14, 1920 |
| 2,342,093 | Weida | Feb. 15, 1944 |
| 2,481,274 | Ambrette | Sept. 6, 1949 |